(12) United States Patent
Suzuki

(10) Patent No.: US 11,989,462 B2
(45) Date of Patent: *May 21, 2024

(54) INFORMATION PROCESSING APPARATUS, METHOD, AND A NON-TRANSITORY STORAGE MEDIUM, RECEIVES FIRST PRINT SETTINGS INFORMATION SUPPORTS THE INTERNET PRINTING PROTOCOL (IPP) AND FURTHER RECEIVES SECOND PRINT SETTINGS THAT DOES NOT SUPPORT THE INTERNET PRINTING PROTOCOL (IPP) FROM PRINTER

(71) Applicant: CANON KABUSHIKI KAISHA, Tokyo (JP)

(72) Inventor: Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,639

(22) Filed: Nov. 15, 2022

(65) Prior Publication Data

US 2023/0071250 A1 Mar. 9, 2023

Related U.S. Application Data

(63) Continuation of application No. 17/135,536, filed on Dec. 28, 2020, now Pat. No. 11,520,533, which is a
(Continued)

(30) Foreign Application Priority Data

Jun. 29, 2018 (JP) .................................. 2018-125177

(51) Int. Cl.
*G06F 3/12* (2006.01)
*G06F 3/0482* (2013.01)
(Continued)

(52) U.S. Cl.
CPC .......... *G06F 3/1204* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 10,162,580 B2 * 12/2018 Sako ..................... G06F 3/1254
2003/0184782 A1 10/2003 Perkins et al.
(Continued)

FOREIGN PATENT DOCUMENTS

CN 101038534 A 9/2007
CN 101334719 A 12/2008
(Continued)

*Primary Examiner* — Haris Sabah
(74) *Attorney, Agent, or Firm* — Canon U.S.A., Inc. IP Division

(57) ABSTRACT

A printer driver communicates with a printer using a predetermined print protocol to obtain first attribute information related to printing from the printer. The print driver generates a print job conforming to the predetermined print protocol based on data received from an application and transmits the generated print job to the extension application (S606). The extension application obtains attribute information in a different form from the first attribute information (S611). The extension application displays a user interface (UI) for print settings based on at least the second attribute information (S613). The extension application generates a print job to be transmitted to the printer based on settings made via the UI and the print job received from the printer driver.

20 Claims, 14 Drawing Sheets

Related U.S. Application Data continuation of application No. PCT/JP2019/024186, filed on Jun. 19, 2019.

(51) Int. Cl.
*G06F 3/04847* (2022.01)
*H04N 1/00* (2006.01)

(52) U.S. Cl.
CPC .......... *G06F 3/1209* (2013.01); *G06F 3/1255* (2013.01); *G06F 3/1287* (2013.01); *H04N 1/00482* (2013.01)

(56) References Cited

U.S. PATENT DOCUMENTS

| | | | | |
|---|---|---|---|---|
| 2007/0216926 A1* | 9/2007 | Kurihara | ............... | G06F 3/1247 358/1.13 |
| 2008/0316517 A1* | 12/2008 | Sato | ...................... | G06F 3/1204 358/1.15 |
| 2016/0295057 A1* | 10/2016 | Miyake | .............. | H04N 1/32502 |
| 2017/0153859 A1* | 6/2017 | Ido | ........................ | G06F 3/1254 |

FOREIGN PATENT DOCUMENTS

| | | | |
|---|---|---|---|
| CN | 102999304 | A | 3/2013 |
| CN | 106933519 | A | 7/2017 |
| CN | 107340979 | A | 11/2017 |
| JP | 2015114764 | A | 6/2015 |
| JP | 2015232896 | A | 12/2015 |
| JP | 2016058041 | A | 4/2016 |

\* cited by examiner

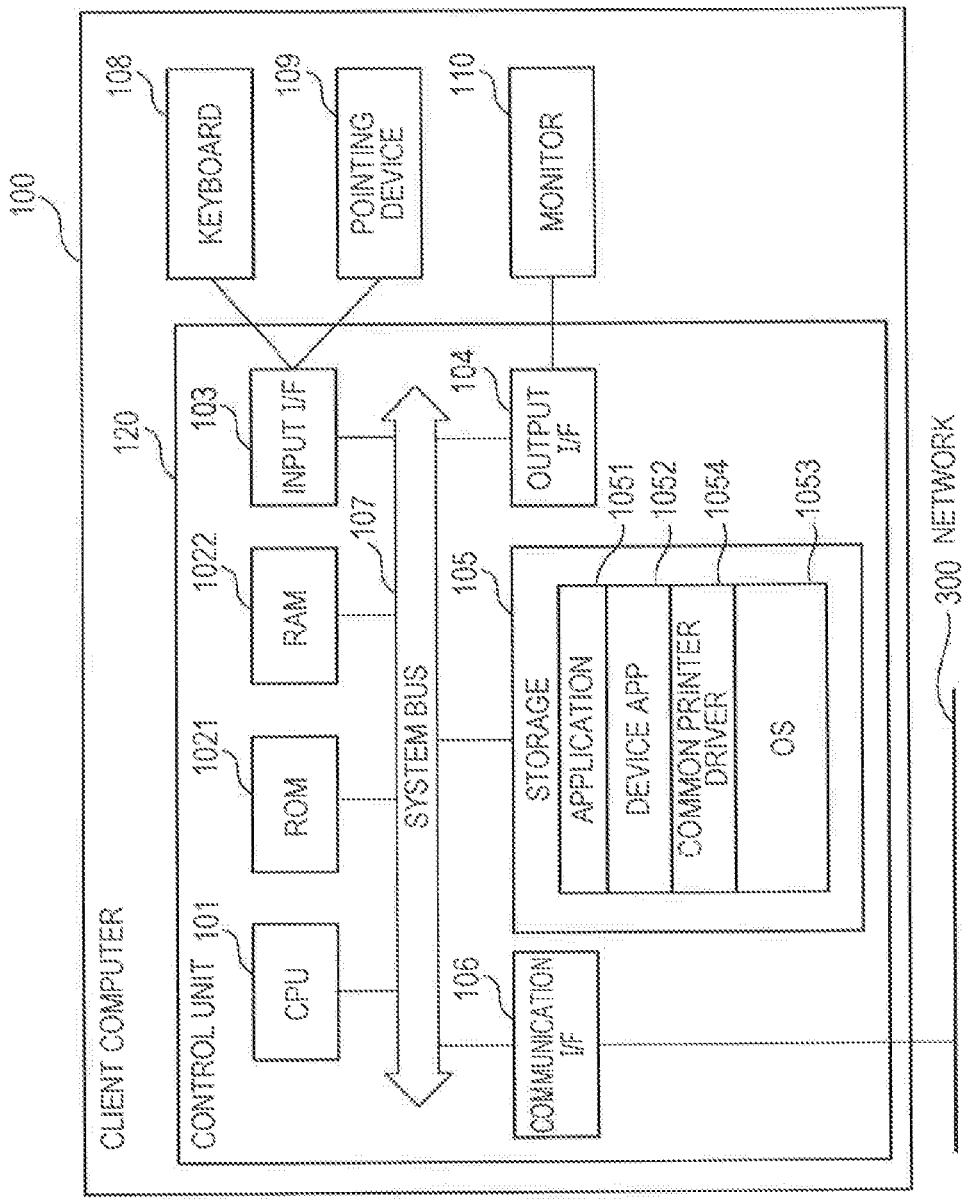

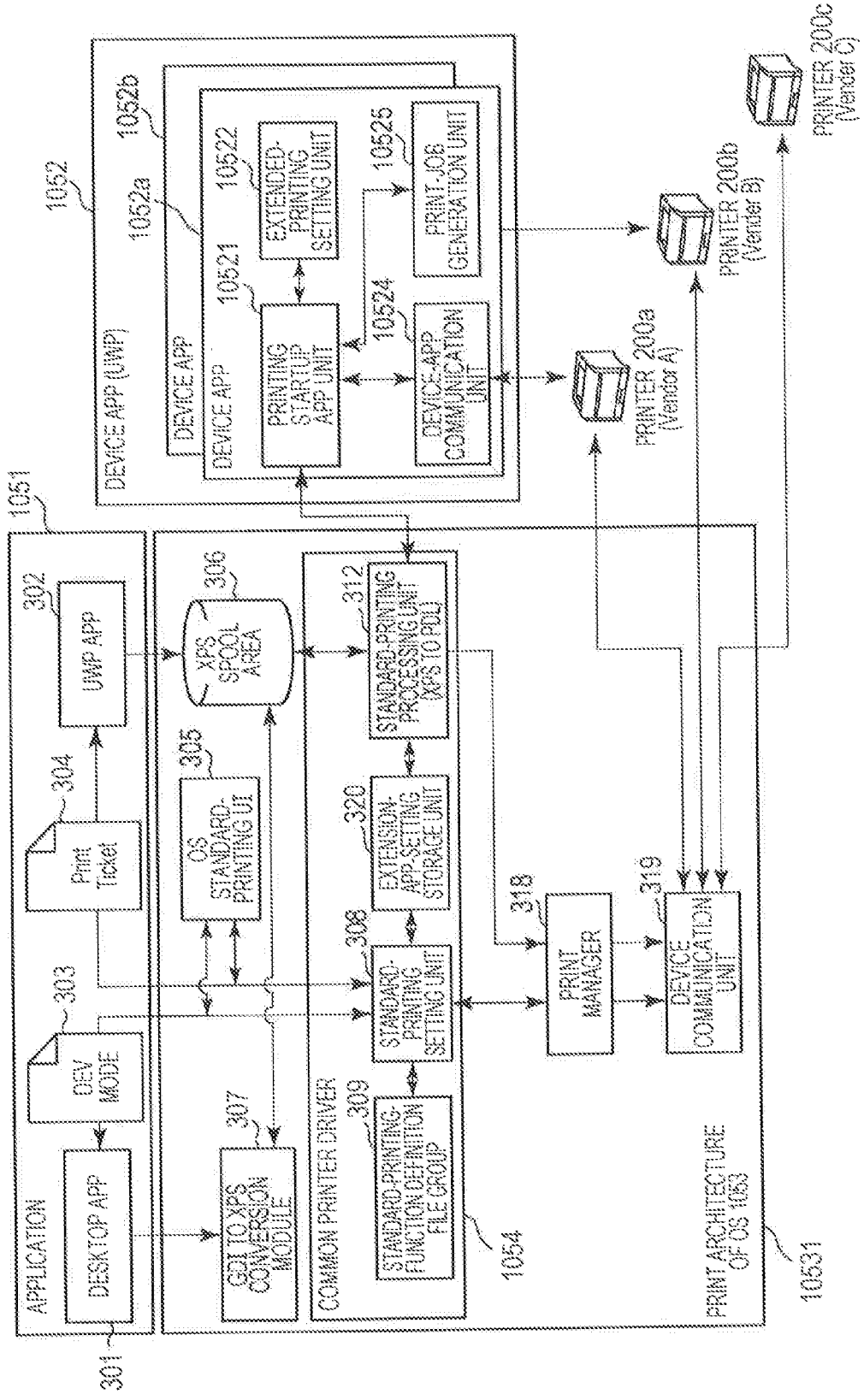

FIG. 4A

```xml
<?xml version="1.0" encoding="utf-8"?>
<psf:PrintCapabilities xmlns:psf="http://2003/08/printing/printschemaframework"
xmlns:xsi="http://www.w3.org/2001/XMLSchema-instance"
 xmlns:xsd="http://www.w3.org/2001/XMLSchema"
 version="1"
xmlns:psk="http://schemas.microsoft.com/windows/2003/08/printing/printschemakeywords"
xmlns:pskv11="http://schemas.microsoft.com/windows/2013/05/printing/printschemakeywordsv11">

<psf:Feature name="psk:PageOrientation">
        <psf:Option name="psk:Portrait" />
        <psf:Option name="psk:Landscape" />
    </psf:Feature>
    <psf:Feature name="psk:DocumentDuplex">
        <psf:Option name="psk:OneSided" />
        <psf:Option name="psk:TwoSidedShortEdge" />
        <psf:Option name="psk:TwoSidedLongEdge" />
    </psf:Feature>
    <psf:Feature name="psk:PageOutputColor">
        <psf:Option name="psk:Color" />
        <psf:Option name="psk:Monochrome" />
    </psf:Feature>

</psf:PrintCapabilities>
```

PrintCapabilities

FIG. 4B

```xml
<?xml version="1.0" encoding="utf-8"?>
<psf:PrintTicket xmlns:psf="http://2003/08/printing/printschemaframework"
xmlns:xsi="http://www.w3.org/2001/XMLSchema-instance"
 xmlns:xsd="http://www.w3.org/2001/XMLSchema"
 version="1"
xmlns:psk="http://schemas.microsoft.com/windows/2003/08/printing/printschemakeywords"
xmlns:pskv11="http://schemas.microsoft.com/windows/2013/05/printing/printschemakeywordsv11">

<psf:Feature name="psk:PageOrientation">
        <psf:Option name="psk:Portrait" />
    </psf:Feature>
    <psf:Feature name="psk:DocumentDuplex">
        <psf:Option name="psk:TwoSidedLongEdge" />
    </psf:Feature>
    <psf:Feature name="psk:PageOutputColor">
        <psf:Option name="psk:Color"/>
    </psf:Feature>

</psf:PrintTicket>
```

PrintTicket

INFORMATION PROCESSING APPARATUS, METHOD, AND A NON-TRANSITORY STORAGE MEDIUM, RECEIVES FIRST PRINT SETTINGS INFORMATION SUPPORTS THE INTERNET PRINTING PROTOCOL (IPP) AND FURTHER RECEIVES SECOND PRINT SETTINGS THAT DOES NOT SUPPORT THE INTERNET PRINTING PROTOCOL (IPP) FROM PRINTER

CROSS-REFERENCE TO RELATED APPLICATIONS

This application is a Continuation of U.S. patent application Ser. No. 17/135,536, filed Dec. 28, 2020, which is a Continuation of International Patent Application No. PCT/JP2019/024186, filed Jun. 19, 2019, which claims the benefit of Japanese Patent Application No. 2018-125177, filed Jun. 29, 2018, all of which are hereby incorporated by reference herein in their entirety.

BACKGROUND OF THE INVENTION

The present invention relates to an information processing apparatus that communicates with a printer, a control method, and a storage medium.

A configuration for transmitting print data to a printer using a printer driver is generally known. The information processing apparatus is loaded with an operating system (OS), which is fundamental software. The printer driver is configured according to a print architecture defined by the OS and is called up by the OS to operate. A vendor that provides a printer provides a printer driver conforming to the specifications of the OS. The OS and the printer driver cooperate to achieve the function of printing using the output target printer.

In using a version prior to Windows® 8 of Microsoft® as the OS, the printer driver is formed of an architecture called "V3 printer driver".

In Windows 8.1 or later, an architecture called "V4 printer driver" has appeared. Since the V4 printer driver places great importance on security, the scalability of the printer driver itself is lower than that of the V3 printer driver. To compensate for such a decrease in scalability, vendors that provide printers can provide dedicated applications for assisting the function of the printer driver. These applications are called Universal Windows Platform Device Apps (UWP Device Apps). The UWP Device Apps can enhance user experience in printing via store applications (UWPs). The V4 printer driver can be linked to Printer Extension, which is a print setting application for performing vendor-unique print settings.

A printer driver called "universal printer driver" is known as a printer driver for controlling a plurality of types of printer with different functions (Japanese Patent Application Laid-Open No. 2013-187571). The printer driver can display an operating screen suitable for an individual printer by type or model.

Another conceivable method is transmitting print data to a printer without using a printer driver. For example, Ubuntu® 17.04 has, as a default function of the OS, a scheme for transmitting print data to a printer conforming to IPP Everyware®. IPP Everyware is a series of standards that enables printing using various printers, for which formulation and popularization are being performed by an industry organization or the like.

The universal printer driver as disclosed in Japanese Patent Application Laid-Open No. 2013-187571 is generally provided vendor by vendor. This allows a plurality of types of printer with different functions sold by the same vendor can be supported by a single universal printer driver. However, it is difficult to support printers of different vendors with a single universal printer driver. This is because communication of print data is performed using different communication methods, page description languages (PDLs) and job description languages (JDLs), vendor by vendor, making it difficult to unify the print drivers. Another reason is that print setting items differ for each vendor, or even similar setting items are differently interpreted, which makes it difficult to support them using a single universal printer driver.

A conceivable method is providing a common printer driver or print client using a scheme conforming to the Internet Printing Protocol (IPP) typified by IPP Everyware, as described above. However, this has a problem in that functions that are uniquely provided by the vendors cannot be used with the common printer driver conforming to the IPP.

SUMMARY OF THE INVENTION

The present invention is made in view of at least one of the above problems. An object of the present invention is to provide a scheme for appropriately using extended capabilities provided by printers of a plurality of vendors even for printing using a printer driver or a print client that generates a print job conforming to a predetermined print protocol. Another object is to achieve both of security and convenience by implementing the printer driver as a class driver conforming to a predetermined print protocol and by implementing extension by vendor using an extension application operating on a sandboxed virtual environment. A still another object is to enable printing that reflects extension capabilities of each vendor using the extension application.

An information processing apparatus of the present invention for achieving at least one of the above objects is an information processing apparatus including a printer driver that communicates with a printer using a predetermined print protocol and an extension application related to the printer driver. The printer driver includes first acquisition means configured to obtain first attribute information related to printing from the printer using the predetermined print protocol, generation means configured to generate a print job conforming to the predetermined print protocol based on data received from the application, and transmission means configured to transmit the generated print job to the extension application. The extension application includes second acquisition means configured to obtain the generated print job, third acquisition means configured to obtain second attribute information related to printing from the printer, the attribute information being in a different form from the first attribute information, display control means configured to display a user interface for print settings based on at least the second attribute information, and generation means configured to generate a print job to be transmitted to the printer based on settings made via the user interface and the print job generated by the printer driver.

Further features of the present invention will become apparent from the following description of exemplary embodiments with reference to the attached drawings.

BRIEF DESCRIPTION OF THE DRAWINGS

FIG. 2 is a diagram illustrating an example of the hardware configuration of a client computer.

FIG. 3 is a diagram illustrating an example of the software configuration of the client computer.

FIG. 4A is a diagram illustrating an example of information on print settings.

FIG. 4B is a diagram illustrating an example of information on print settings.

FIG. 14 is a diagram illustrating an example of extended settings in a modification example.

DESCRIPTION OF THE EMBODIMENTS

Embodiments of the present invention will be described hereinbelow with reference to the drawings. The following embodiments do not necessarily limit the present invention. Not all combinations of the features described in the present embodiments are essential for the solution of the present invention.

First Embodiment

Figure 1:
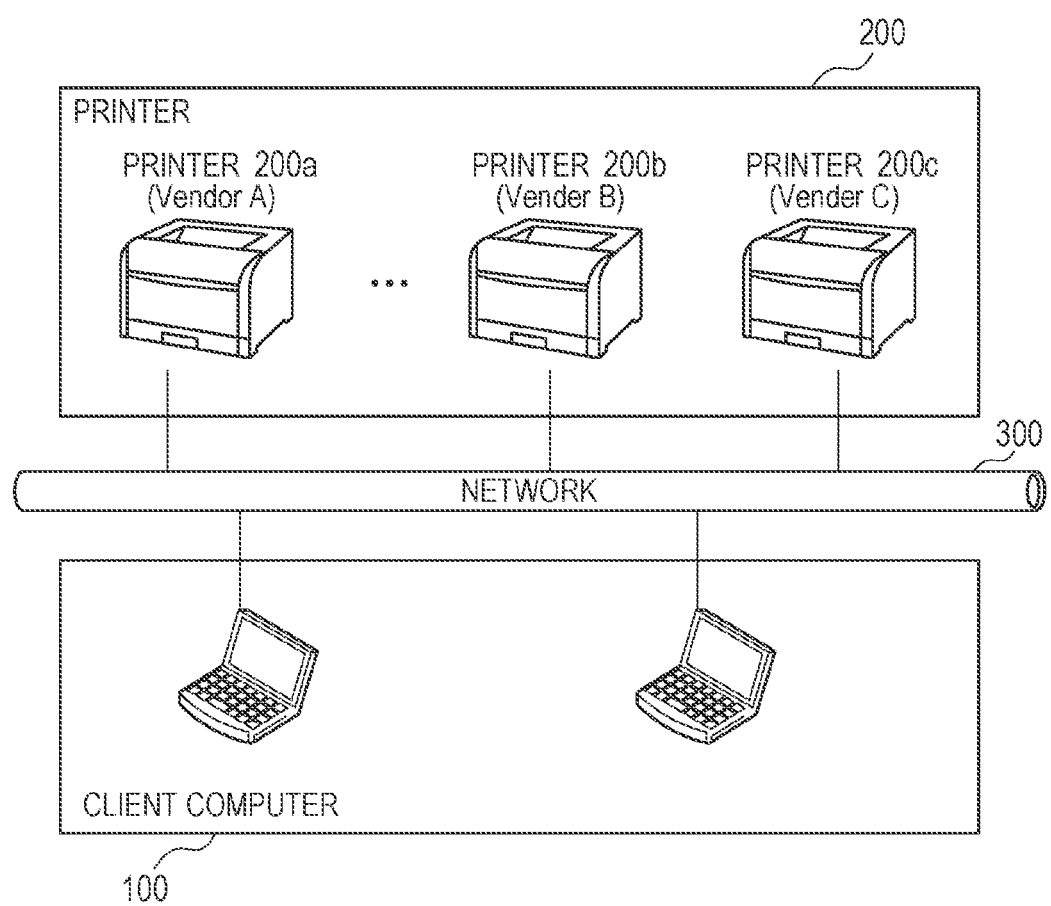
FIG. 1 is a diagram illustrating an example of a printing system.

Referring first to FIG. 1, the configuration of a printing system according to the present invention will be described. The printing system according to present embodiment includes a client computer 100 and printers 200a to 200c. The client computer 100 and the printers 200a to 200c are connected on a network 300 so as to communicate with each other. The communication among the devices may be a communication via a wireless network or a communication via a wired network. The communication via a wireless network may be a wireless communication via an access point conforming to IEEE802.11 or a direct wireless communication, such as Wi-Fi Direct®. In the present embodiment, the above configuration is described as an example of the printing system. However, this is not intended to limit the present invention. One or more communication apparatuses and printing apparatuses need only be communicably connected via a network.

In the present embodiment, single-function printers 200a to 200c are described as an example of a printer that receives a print job and print images on a sheet. However, this is not intended to limit the present invention. The printer may be a multi-function peripheral (MFP) having both of a printing function and a scanning function.

In the present embodiment, the printers 200a to 200c are manufactured by different vendors for illustrative purposes. The printers 200a to 200c can receive a print job conforming to Internet Printing Protocol (IPP) from the client computer 100 or the like and can print images on a sheet on the basis of the print job.

The printers 200a to 200c also have a function of receiving a print job of a different format from that of the IPP and interpreting it. For example, the printer 200a can interpret a print job including page description language (PDL) data conforming to a laser-beam-printer (LBP) image processing system (LIPS®) format. Furthermore, the printer 200a can interpret a print job containing PDL data conforming to a Printer Command Language (PCL®) format. The LIPS format is also referred to as Ultra Fast Rendering (UFR®) format. The printer 200b can interpret a print job containing PDL data conforming to Printer Command Language (PCL®) format. However, the printer 200b does not support a print job of the LIPS (UFR) format. The printer 200c is an inkjet printer and can interpret a print job conforming to Epson Standard Code for Printer (ESC/P). However, the printer 200c does not support a print job of the PCL format and the LIPS format. Thus, when the vendors which are the manufacturers of the printers differ, the kinds of support PDL also differ. Even the same printers have a little difference in support functions, depending on the type of PDL used. The type of PDL that the individual printers can interpret is given for mere illustrative purposes. The formats of the PDL that the printer can interpret may be PCL, LIPS, ESC/P, Refined Printing Command Stream (RPCS), Post Script (PS), and Advanced Rendering Tools (ART). The formats may include Sharp Printer Description Language2 (SPDL2) format. The formats may also include a format derived on the basis of the PDL described above. Each printer supports at least one of the PDL formats derived on the basis of the above PDL format.

Next, the client computer 100, which is one example of the information processing apparatus, will be described. In the present embodiment, the client computer 100 is a personal computer (PC). However, this is given for mere illustrative purposes. The client computer 100 may be a terminal, such as a tablet terminal or a wearable computer in which a head-mounted display and a computer are installed.

The client computer 100 can communicate with the printers 200a to 200c on the network 300. The client computer 100 can generate a print job on the basis of print target data and transmit the print job to each printer.

The hardware configuration of the client computer 100 will be described with reference to FIG. 2. FIG. 2 is a block diagram illustrating an example of the hardware configuration of the client computer 100.

A central processing unit (CPU) 101 is a processor that controls the overall operation of a control unit 120. The control unit 120 includes a read only memory (ROM) 1021 and a random access memory (RAM) 1022, which are memories, and a storage 105, which are connected via a system bus 107. The control unit 120 further includes interfaces (I/Fs) 103 and 104 for connecting input/output devices and a communication OF 106 for communicating with an external device over a network.

The RAM 1022 is a volatile memory, which is used as a temporary storage area in which various control programs stored in a work area, the ROM 1021, and the storage 105 are to be expanded.

The ROM 1021 is a nonvolatile memory, in which a computer boot program and so on are stored. Examples of the storage 105 include a nonvolatile flash memory and a hard disk drive (HDD) with a larger capacity than that of the RAM 1022. The storage 105 stores an operating system (OS) 1053 for controlling the entire computer 100 and programs of various applications 1051 that operate on the OS 1053. The storage 105 also stores a common printer driver 1054 that generates a print job conforming to a predetermined print protocol, such as the IPP, and programs of device apps 1052a to 1052b that work with the common printer driver 1054 (as will be hereinafter described in detail).

The various applications, such as the applications 1051 and the device apps 1052a to 1052b, can be installed in the computer 100 via a compact disk (CD)-ROM, a universal serial bus (USB) memory, or the network 300.

The CPU 101 executes the programs of the OS and the programs of the applications expanded on the RAM 1022 to control the computer 100. Thus, the hardware, such as the CPU 101, the ROM 1021, the RAM 1022, and the storage 105, constitute what is called a computer.

Although the client computer 100 is such that a single CPU 101 executes the processes illustrated in the flowcharts described later, the client computer 100 may have another configuration. For example, a plurality of processors may execute the processes illustrated in the flowcharts described later in cooperation.

The input OF 103 connects a keyboard 108 and a pointing device 109 with the control unit 120. The keyboard 108 and the pointing device 109 function as a receiving unit for receiving instructions from the user. The receiving unit can detect the selection of a display item, such as a key, displayed on the screen. The output OF 104 connects a monitor 110 that displays information with the control unit 120. The monitor 110 functions as a display that displays information. If the client computer 100 is a tablet terminal or the like, display of information to the user and reception of operations are performed via a touch panel display serving both as a receiving unit and a display. In this case, the user can input a desired operator instruction to the client computer 100 by performing a touch operation using an object, such as a finger.

The communication OF 106 is an interface for communication with an external device, such as a printer on the network 300, or a server on a cloud.

[Software Configuration of Computer 100]

FIG. 3 is a diagram illustrating an example of the software configuration of the client computer 100 in the present embodiment. The OS 1053 is system software for controlling the entire computer 100. Here, an OS of Windows®10 or later is installed as an example.

The OS 1053 provides a print architecture 10531 for printing using a printer driver. The print architecture 10531 is what is called a V4 print architecture that converts spool data in XML paper specification (XPS) format to print data (PDL) with the printer driver.

An example of a printer driver that can be installed in a computer is a driver that is referred to as a universal printer driver. An OS, such as Ubuntu® 17.04, has a scheme for transmitting print data to a printer that supports IPP Everyware® as a default function of the OS. IPP Everyware is a series of standards that enables printing using various printers, for which formulation and popularization are being performed by an industry organization or the like.

The universal printer driver described above is generally provided vendor by vendor. This allows a plurality of types of printer with different functions sold by the same vendor can be supported by a single universal printer driver. However, it is difficult to support printers of different vendors with a single universal printer driver. This is because communication of a print job is performed using different communication methods, PDLs and job description languages (JDLs), vendor by vendor, making it difficult to unify the print drivers. Another reason is that print setting items differ for each vendor, or even similar setting items are differently interpreted, which makes it difficult to support them using a single universal printer driver.

If a scheme for executing printing without individually installing a V3-format or V4-format printer driver provided by vendors is provided also in an environment of Windows or the like, user convenience will be increased.

In view of the above, the present embodiment provides a common printer driver using the scheme of a predetermined print protocol can be provided in a Windows environment. The following description is made using an example in which the predetermined print protocol is the commonly used IPP.

Suppose a case in which a common printer driver conforming to the IPP is simply installed. In this case, a print job including printing attributes conforming to the IPP and a PDL based on the IPP are generated and transmitted to the printer. This has a problem in that functions that are not defined in the IPP and are independently provided by a vendor (for example, a needleless binding function for binding prints without using needles and a box storage function for storing print data in a storage of a printer) cannot be used.

Accordingly, the present embodiment enables an extension application for using functions specific to each vender to be invoked from a common printer driver conforming to the IPP so that extended functions of each vendor can be provided. A specific scheme will be described hereinbelow.

Referring back to FIG. 3, the common printer driver 1054 that supports printers of a plurality of vendors is installed in the client computer 100 as a printer driver. The common printer driver 1054 may be a class driver installed as a standard function of the OS 1053 or a universal printer driver that is separately installed in the computer 100 by the user.

The print architecture 10531 includes a GDI to XPS conversion module 307, the common printer driver 1054, an OS standard-printing UI 305, a print manager 318, and a device communication unit 319. It is also possible to install a printer driver different from the common printer driver (for example, a printer driver only for a model that the vendor provides).

[Print Processing Using Common Printer Driver 1054]

First, print processing that uses the common printer driver 1054 will be described. Examples of a desktop app 301 include "Win32/64 application" and ".NET application". A UWP app 302 is a universal windows platform (UWP) application that operates on the OS 1053. The UWP application is an application distributed via a Windows store and operates in an execution environment different from those of the desktop app 301 and the print architecture 10531. The UWP app operates in an individual sandbox (virtual environment) and is limited in access to the system area and in available application programming interface (API). In other words, the UWP app has low access authority to resources in the apparatus, compared with the desktop app and the device driver. For this reason, the UWP app is less likely to affect the system than the desktop app and the driver programs.

These desktop app 301 and UWP app 302 can print contents (for example, documents and images) in cooperation with the print architecture 10531.

The desktop app 301 performs printing using Graphics Device Interface (GDI), which is a graphics component that generates a print image of the printer. When printing using the GDI, the desktop app 301 transmits GDI drawing data to the GDI to XPS conversion module 307, which is a module of the OS 1053. The module 307 converts the GDI drawing data to an XPS spool file. The converted XPS spool file is temporarily stored in an area 306. In contrast, for printing via the UWP app 302, there are two methods, a method for creating an XPS file with the UWP app itself and a method for creating an XPS file with the OS 1053 according to a drawing command from the UWP app. The XPS file created by either method is transferred to the area 306, where it is temporarily stored.

Figure 8:
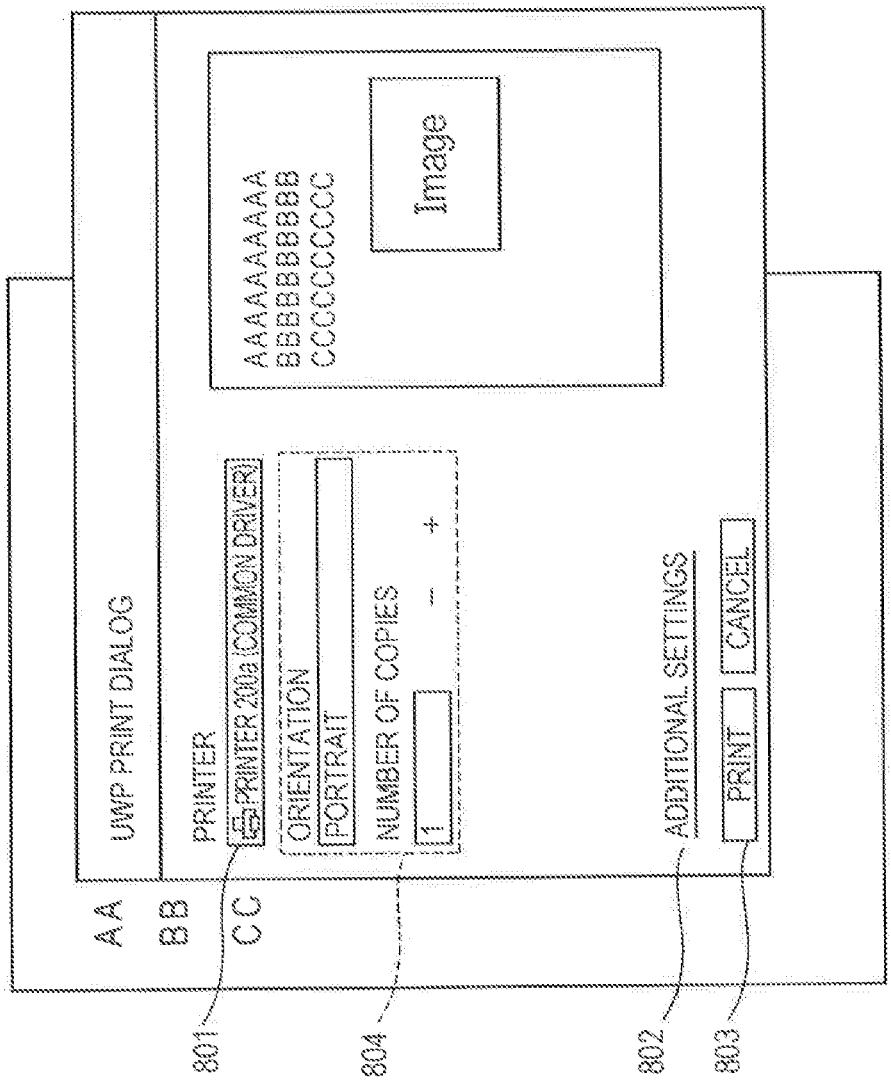
FIG. 8 is a diagram illustrating an example of a screen displayed on the display of the client computer.

The user executes print processing via the desktop app 301 or the UWP app 302 displayed on the monitor 110 of the output unit using the input unit, such as the keyboard 108 or the pointing device 109 typified by a touch panel/mouse. Here, printing via the UWP app 302 will be described as an example. FIG. 8 illustrates an example of a screen displayed when printing is performed via the UWP app 302, which is an example of a setting screen (user interface), referred to as a modern print dialog, provided by the OS 1053. When a print instruction is given via the UWP app 302, the CPU 101 displays the print dialog on the monitor 110. The user can select an area 801 to select a printer to be used for printing and can select print settings by selecting the items in an area 804. The user can give a print instruction using a print key 803. Here, an example in which a printer compliant with the common printer driver 1054 is selected by the user will be described. An additional settings key 802 is a key for detailed print settings. Upon detecting that the key is selected, the OS activates the OS standard-printing UI 305 to display a print setting screen (user interface) conforming to the IPP (not illustrated).

Upon detecting a user operation to change the print settings, the OS 1053 invokes a standard-printing setting unit 308 of the common printer driver 1054. The standard-printing setting unit 308 refers to a definition file for the printer, selected from the standard-printing-function definition file group 309. The standard-printing setting unit 308 creates standard setting data (303 or 304) indicating the current print settings and PrintCapabilities indicating the printing capabilities of the selected printer on the basis of the definition file referred to.

The standard-printing-function definition file is a definition file indicating the capabilities of the printer, generated on the basis of attribute information obtained from the printer at searching for an IPP printer, for example. Accordingly, the standard-printing-function definition file group 309 stores different files printer by printer.

Next, generation of the definition file will be described. If a definition file for the selected printer is not stored in the storage, the common printer driver 1054 sends an inquiry to the printer about capability information. The common printer driver 1054 inquires of the printer the capabilities via the print manager 318 and the device communication unit 319. The print manager 318 can search for a printer supporting the IPP and obtain the printer capabilities, in addition to controlling the print job, to be described later. Specifically, the printer capabilities are obtained by a printer-attribute requesting operation (Get-Printer-Attributes Operations) defined in RFC2911. First, the print manager 318 transmits Get-Printer-Attributes Request to the printer 200. In response to the request, attribute information on the printer 200 is obtained. Examples of the printer capability information obtained by the printer-attribute requesting operation include standard print-setting capability information, for example, whether "two-sided" and "color printing" are available. The capabilities (attributes) obtained by the printer-attribute requesting operation is support information on attributes prescribed in the IPP. Accordingly, vendor-specific functional information (for example, a needleless function and a box printing function) cannot be obtained by the printer-attribute requesting operation of the IPP. The obtained attribute information is transferred to the standard-printing setting unit 308. The standard-printing setting unit 308 generates a definition file on the basis of the attribute information obtained using the IPP and stores the definition file in the storage 105.

Returning to the description of the print settings, the desktop app 301 uses binary DEVMODE 303 as standard setting data indicating the current print settings. The UWP app 302 uses PrintTicket 304 described in XML, which is a markup language. The DEVMODE 303 or PrintTicket 304 is standard setting data that holds print settings to be reflected to a print job conforming to the IPP.

FIGS. 4A and 4B are diagrams for illustrating PrintCapabilities and PrintTicket. Both are XML-format files conforming to rules prescribed in the print architecture. A file 400 illustrated in FIG. 4A is an example of PrintCapabilities. The file 400 lists combinations of an available print setting item and a set value that can be set for the print setting item. Applications and user interfaces for print settings provided by the OS can constitute a print setting screen on the basis of the file 400. Although this illustrates partial settings because of space limitations, this is not intended to limit the present invention. The file 400 may further include print setting items based on the attribute information conforming to the IPP and setting items for post-processing.

In contrast, a file 401 illustrated in FIG. 4B is an example of PrintTicket 304, in which current print settings are listed. User interfaces for print settings provided by the application 1051 and the OS 1053 can change the print settings by rewriting the PrintTicket 304.

The OS standard-printing UI 305 provides a screen for print settings (user interface) on the basis of the information described in PrintCapabilities for a selected printer.

Upon detecting that a print instruction is given from the user, the OS or the application generates an XPS spool file. The generated XPS spool file is transferred to the standard-printing processing unit 312. The standard-printing processing unit 312 renders the received XPS spool file to convert it to PDL data conforming to the IPP. Examples of the PDL data conforming to the IPP include Portable Document Format (PDF) and PWG-Raster format data.

Furthermore, the standard-printing processing unit 312 generates print attribute information conforming to the IPP on the basis of the settings specified by the PrintTicket 304 included in the XPS spool file.

The PDL data and the IPP-compliant print attribute information are managed by the print manager 318 that manages the schedule of print processing. The print manager 318 creates a print job conforming to the IPP on the basis of the PDL data and the IPP-compliant print attribute information and registers the created print job with a queue (a waiting line). When the printer 200 becomes ready for printing, the IPP-compliant print jobs are transmitted in order of registration with the queue via the device communication unit 319. To convert the print data coming from the application to PDL data conforming to the IPP in this manner is the main role of the common printer driver 1054.

The above processing can only cope with the capabilities prescribed as IPP specifications and cannot cope with various functions provided by the printers 200a to 200c. Accordingly, in the present embodiment, the device app 1052, which is an extension application, uses acquisition of detailed capability information using another communication method to deal with extended print settings other than the standard print settings.

The device apps 1052a to 1052b are different applications from the common printer driver 1054 and operate on a UWP platform. These applications are applications for making the functions of the printer 200 flexibly available as necessary on the basis of printing using the common printer driver based on the IPP. These applications operate in a sand-boxed UWP execution environment. This reduces the influence on the entire system even if the applications are hung up or make an error.

Here, an example in which the device app 1052a is installed as a device application for the printer 200a is illustrated, and an example in which the device app 1052b is installed as a device application for the printer 200b is illustrated. However, a device application for the printer 200c is not installed.

Accordingly, if the user selects the printer 200c as the output target of the common printer driver, the processing for extended print settings is skipped, and processing conforming to the IPP is performed. A given number of users do not need extended print settings using an extension application. The common printer driver 1054 stores setting on whether to activate the extended print settings in a setting storage unit 320 for each printer. The setting can be changed by user operation.

The standard-printing processing unit 312 determines whether to activate the device app on the basis of the installation situation of the extension application and the setting stored in the setting storage unit 320.

The device app 1052 includes a printing startup app unit 10521, an extended-printing setting unit 10522, a print-job generation unit 10525, and a device-app communication unit 10524. The printing startup app unit 10521 is a module invoked for printing and manages the extended-printing setting unit 10522, the device-app communication unit 10524, and the print-job generation unit 10525. The device app 1052 is linked with printers. The device app 1052 can provide a function of displaying a preview immediately after printing, a function of displaying a user interface that prompts changing print settings, and so on. Although the present embodiment assumes that a screen provided by the device app is invoked after PDL conversion is performed by the standard-printing processing unit 312, this is not intended to limit the present invention. The extended-printing setting unit 10522 has a function of displaying an extension user interface that allows more-detailed print settings than the print settings conforming to the IPP. The device-app communication unit 10524 has a function for the individual modules of the device app 1052 for communicating with the printer 200. The device-app communication unit 10524 obtains information on the printer 200 using a specific communication method or a specific control method. Examples of the specific communication method include Web Services for Devices (WSD) protocol and Simple Network Management Protocol (SNMP). The specific communication method may be a communication method using a vendor-specific protocol. Printer information can also be obtained using a control command defined in a job control language or a printer control language. For example, information may be requested from the printer using a command defined in Printer Job Language (PJL), PostScript, or Common Peripheral Controlling Architecture (CPCA). Information can also be obtained from the printer using another protocol, Network Printing Alliance Protocol (NPAP).

The print-job generation unit 10525 has a function of reflecting PDL conversion processing and extended print settings in the print job.

For example, the print-job generation unit 10525 of the device app 1052a has a function of converting PDL data included in an IPP-compliant print job to LIPS format (UFR format). The print-job generation unit 10525 of the device app 1052b has a function of converting PDL data contained in an IPP-compliant print job to PCL format. The PDL format converted by the device app 1052 is given for mere illustrative purposes and is not intended to limit the present invention. The PDL format be converted to PCL, RPCS, PS, ART, or SPDL2 format. The PDL data conversion processing is not indispensable. For example, when the printers 200a to 200c support PDF direct printing, the conversion processing may be skipped.

Figure 5:
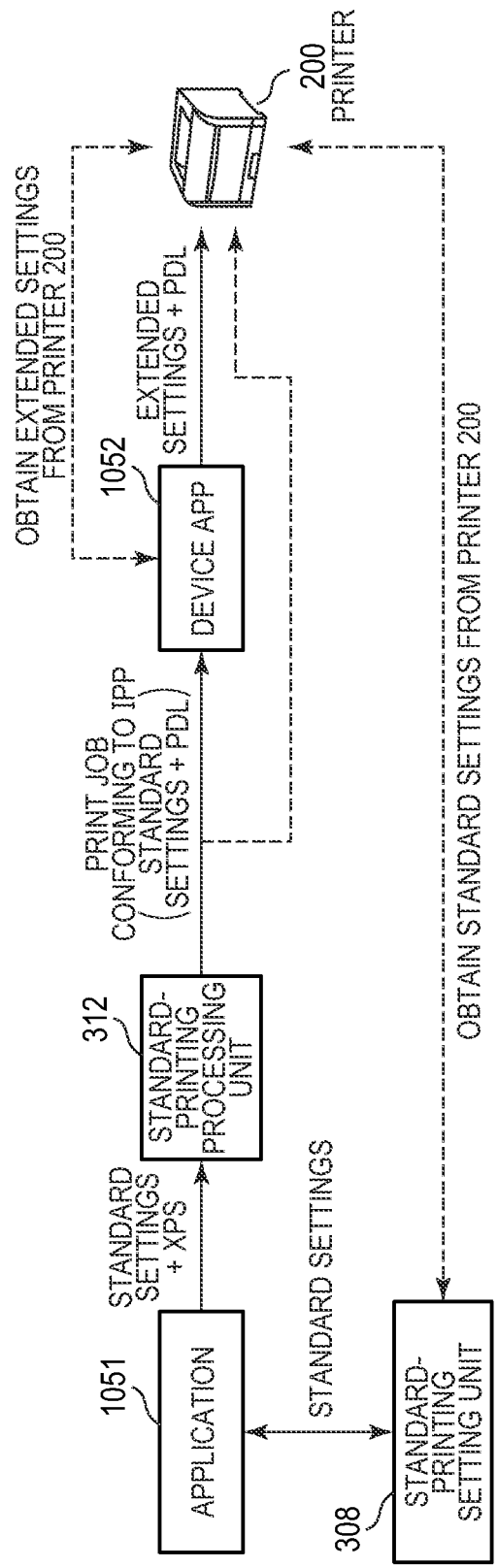
FIG. 5 is a schematic diagram illustrating an example of the processing procedure of the printing system.

Next, data processing in executing printing will be described, in outline, with reference to FIG. 5. FIG. 5 is a schematic diagram illustrating the processing procedure of printing performed by the user.

First, the application 1051 obtains standard setting data that is set in PrintTicket format or DEVMODE format using the standard-printing setting unit 308. The standard-printing setting unit 308 obtains a definition file for a selected printer from the definition file group 309 and generates standard setting data indicating the current print settings on the basis of the definition file. The standard setting data is changed as appropriate via a screen (user interface) for changing the print settings displayed by the application 1051 or the OS. Upon receiving a print start instruction, the application transfers the standard settings and the XPS spool file obtained by the standard-printing setting unit 308 to the standard-printing processing unit 312.

The standard-printing processing unit 312 converts the received XPS spool file to PDL conforming to the IPP. The standard-printing processing unit 312 generates print attributes conforming to the IPP on the basis of the standard setting data indicating the current print settings. Then, the common printer 150 generates a print job on the basis of the converted PDL and the attribute information based on the IPP and passes the print job to the device app 1052. If it is determined that the device app is not to be used, then the IPP-compliant print job is transmitted directly to the printer.

Next, the device app 1052 generates an extension setting screen (user interface) containing setting items that are not defined in the IPP from the capability information indicating extended settings, obtained from the printer 200, and displays the screen on the monitor 110.

The device app 1052a for the printer 200a will be described by way of example.

Figure 9:
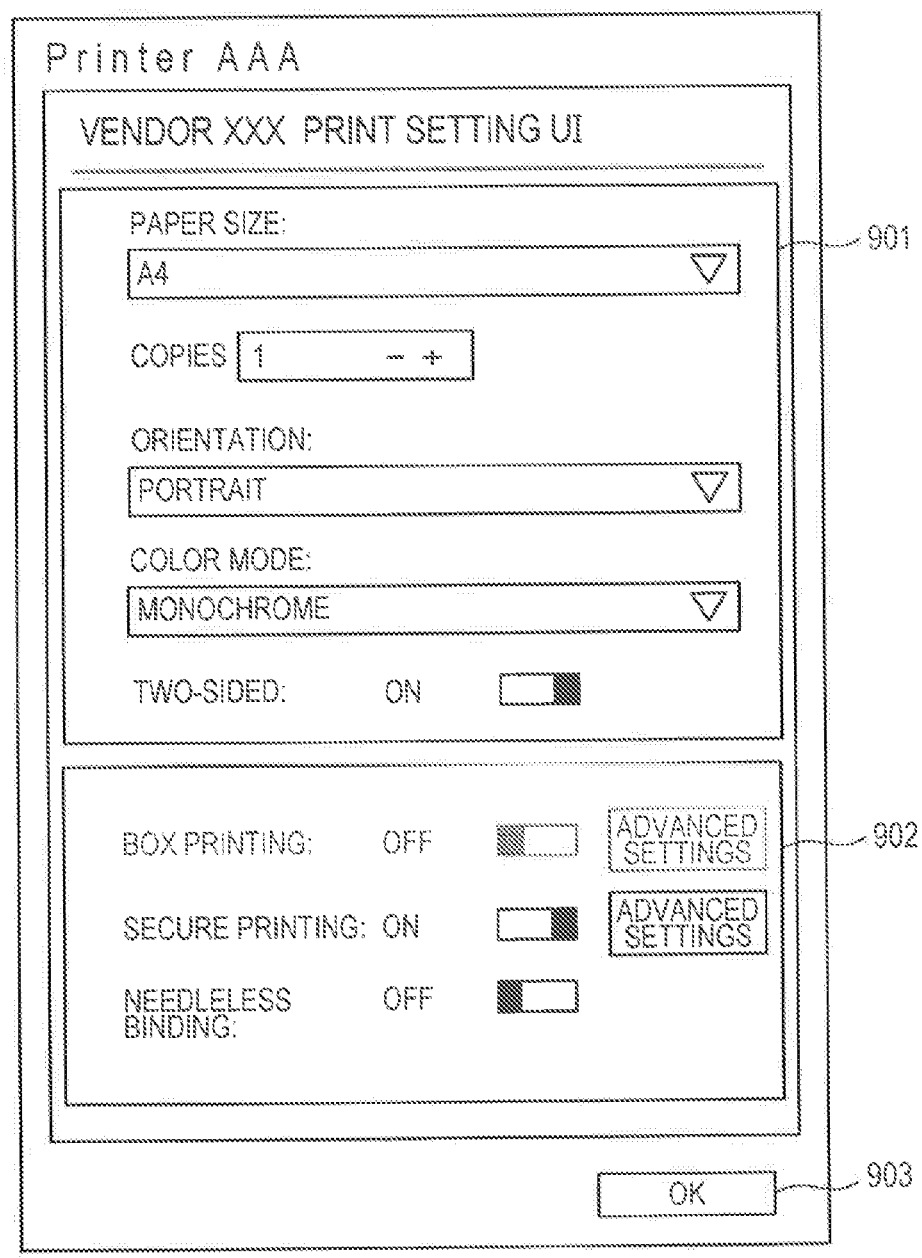
FIG. 9 is a diagram illustrating an example of a screen displayed on the display of the client computer.

FIG. 9 illustrates an example of the print setting screen that the device app 1052a displays on the monitor 110. Reference sign 901 denotes an example of the standard print settings. Reference sign 902 denotes an example of the extended print settings based the device capability information. The settings "box printing", "secure printing", and "needleless binding" displayed in 902 are examples of print settings that operate in vender-specific specifications. This allows the user to perform print setting based on specifications that are not defined in the IPP via the extension setting screen. An OK key 903 is a key for starting printing that reflects the print settings.

Upon detecting that the OK key 903 is selected, the device app 1052a generates extended settings, which are job attributes to be given to the print job, on the basis of the settings made via the extension setting screen. Next, the device app 1052a transmits the print job containing the PDL and the job attributes to the printer 200*a*. In this case, the job attributes contained in the print job can be expressed with a common peripheral controlling architecture (CPCA) command, and the PDL data can be expressed in LIPS format (UFR) format.

Finally, the printer 200 receives the IPP-compliant print job or the vendor-specific print job and prints an image on a sheet on the basis of the print job.

Next, the specific control will be described with reference to the flowcharts of FIGS. 6 and 7.

[Control of Client Computer 100]

First, the operation of the client computer 100 will be described. FIG. 6 is a flowchart illustrating control of the client computer 100. The operations (steps) illustrated in the flowchart of FIG. 6 are implemented by the CPU 101 reading programs for implementing the control modules stored in the ROM 1021 or the storage 105 into the RAM 1022 and executing the programs. The processes illustrated in the flowcharts are implemented by the modules of the application 1051, the OS 1053, and the device app 1052 and software components in cooperation. Some processes, such as data transmission and input and output of information, are implemented in cooperation with the individual I/Fs. The processes are described with the software components and the applications as subject words to clearly illustrate the programs, which serves as subjects for implementing the processes.

Figure 6:
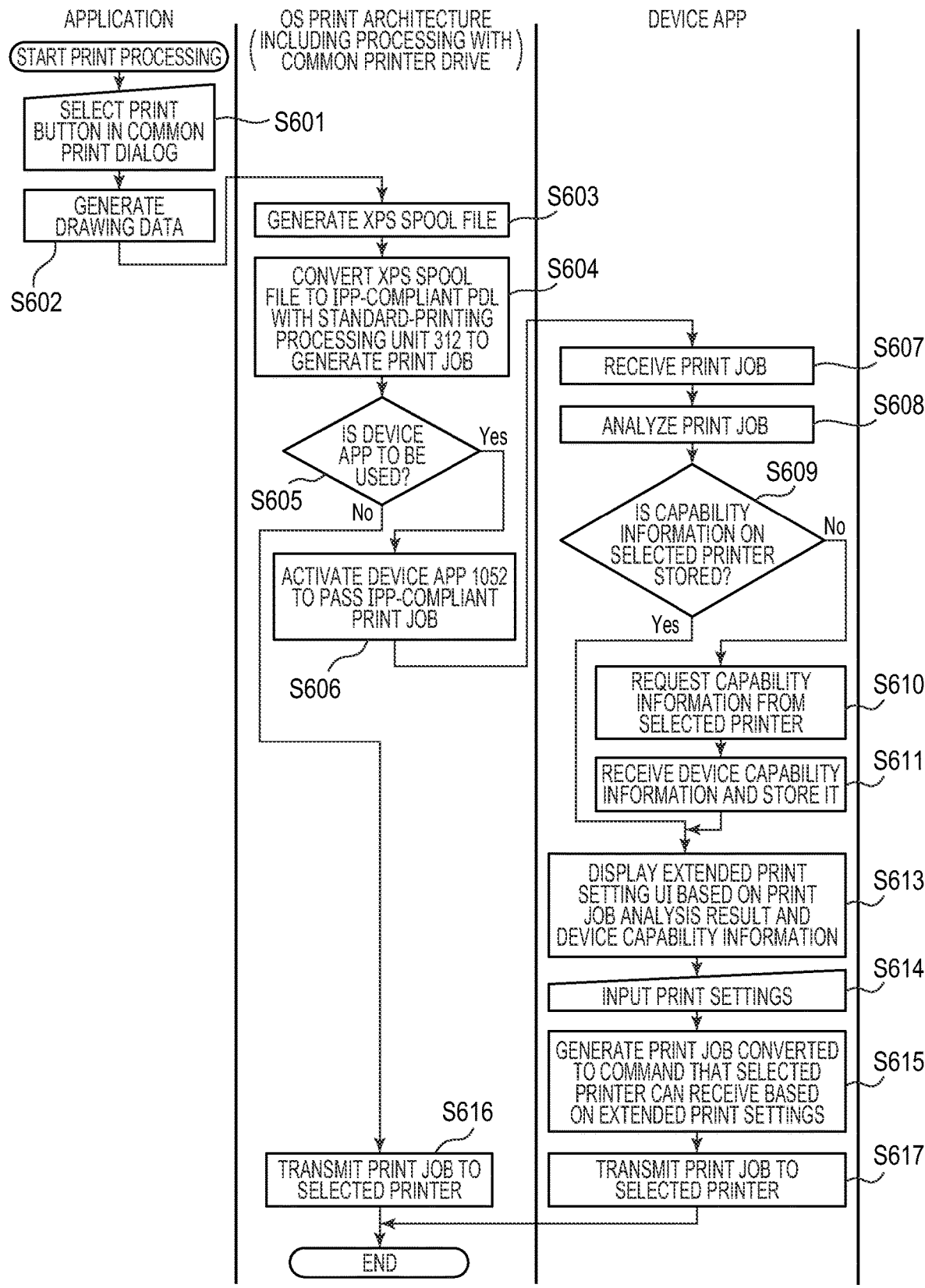
FIG. 6 is a flowchart illustrating an example of control of a client computer.
Figure 7:
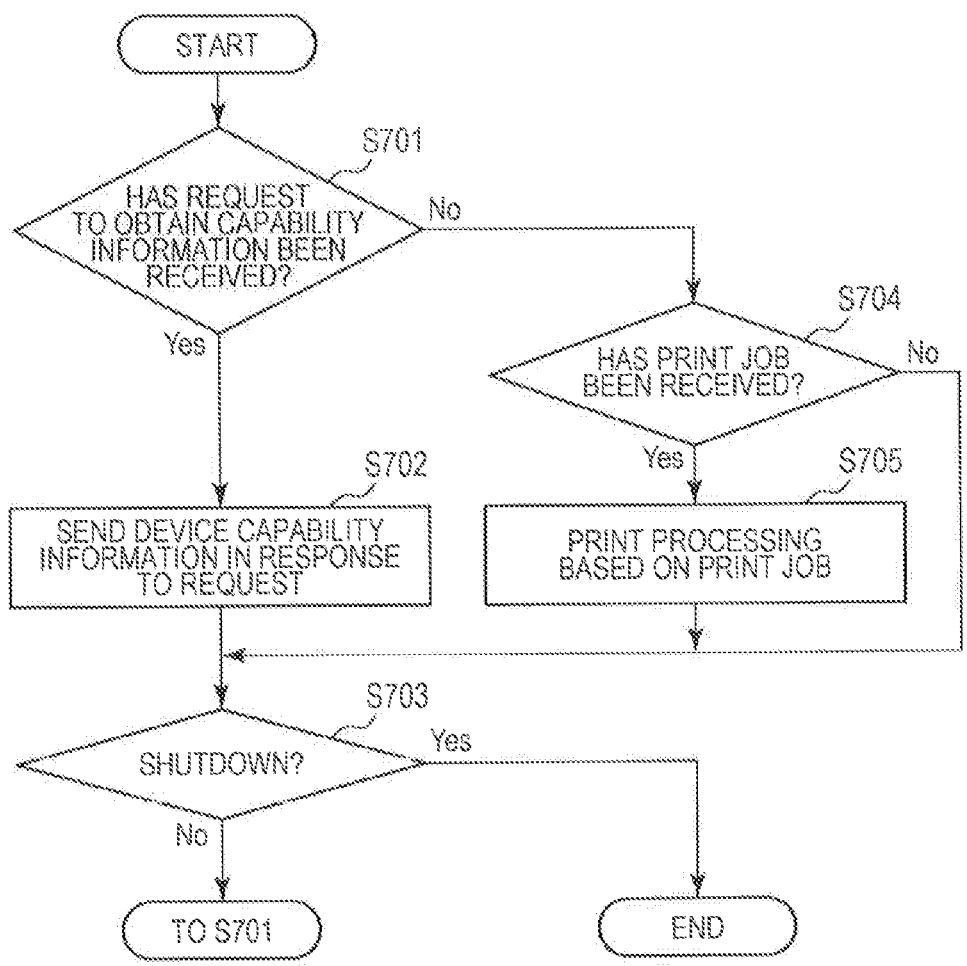
FIG. 7 is a flowchart illustrating an example of control of a printer 200.

The flowchart of FIG. 6 illustrates processes executed when a printer that supports the common printer driver 1054 is specified as a printer to be used and an instruction for printing is received from the user.

In step S601, the application 1051 detects that the print key 803 in the common print dialog is pressed by the user. In step S602, the application 1051 generates drawing data and passes the drawing data to the OS 1053.

In step S603, the OS 1053 generates an XPS spool file. In the case of printing via the desktop app 301, the OS generates the XPS spool file using the GDI to XPS conversion module 307.

In step S604, the print architecture 10531 and the common printer driver 1054 cooperate to generate a print job. The standard-printing processing unit 312 converts the XPS spool file to PDL conforming to the IPP. The standard-printing processing unit 312 generates print attributes conforming to the IPP on the basis of standard settings indicating print settings to be set for the job. The print manager 318 generates the print job on the basis of the PDL and print attributes conforming to the IPP.

Next, in step S605, the OS 1053 determines whether to use a device app. Specifically, the OS 1053 determines whether a device app supporting a printer selected as an output target (hereinafter referred to as selected printer) is present. If a device app for the selected printer is not present, the processing proceeds to S616. In contrast, a device app for the selected printer is present, the OS 1053 determines whether to start the device app for the selected printer with reference to the extension-app-setting storage unit 320 further. Specifically, the OS 1053 refers to settings for each printer, stored in the extension-app-setting storage unit 320, on the basis of the ID or the like of the selected printer. If the settings referred to on the basis of the ID indicate setting not to start the device app, the processing proceeds to S616. In contrast, if the setting referred to on the basis of the ID indicates setting to start the device app, the processing proceeds to S606.

In S616, the OS 1053 transmits the IPP-compliant print job to the selected printer. Upon completion of the transmission, the series of processes ends.

In contrast, in step S606, the OS 1053 activates the device app 1052 for the selected printer and passes the IPP-compliant print job to the device app 1052. At that time, information for uniquely identifying the selected printer and information for communicating with the selected printer (for example, an IP address) are also passed.

In step S607, the printing startup app unit 10521 of the device app 1052 receives the print job and the information on the selected printer, passed from the OS 1053. In step S608, the printing startup app unit 10521 of the device app 1052 analyzes the print job.

In step S609, the printing startup app unit 10521 of the device app 1052 determines whether the capability information on the selected printer is stored (whether extended capabilities have been obtained). If the capability information on the selected printer is stored, the processing proceeds to S613, and if the capability information on the selected printer is not stored, the processing proceeds to S610.

In step S610, the device-app communication unit 10524 inquires capability information from the selected printer 200. The device-app communication unit 10524 of the device app 1052 requests the capability information from the selected printer 200 using the specific communication method and the specific control command described above. In step S611, the device-app communication unit 10524 receives device capability information in response to the request transmitted in S610. The received capability information and the information in which the identifier of the selected printer is associated are stored in a common storage area that is accessible from the device app 1052. This processing allows omitting processing for acquiring device capability information in the next and subsequent processing. The device capability information stored here contains setting items that are more detailed than attribute information (capability information) that can be obtained by a printer-attribute requesting operation (Get-Printer-Attributes Operations) of the IPP.

Next, in step S613, the extended-printing setting unit 10522 of the device app 1052 displays the extended print setting UI illustrated in FIG. 9 on the basis of the print job analysis result and the device capability information.

In step S614, the extended-printing setting unit 10522 of the device app 1052 receives an instruction to change the print settings based on user operation. As illustrated in FIG. 9, print setting 902, which is not prescribed in the IPP, can be set on the extended print setting screen (UI).

In step S615, the print-job generation unit 10525 of the device app 1052 generates a print job converted to a command that can be received by the selected printer on the basis of the extended print settings. For example, if the selected printer is the printer 200*a*, and the device app is 1052*a*, the print job generation unit 10525 generates a print job whose job attributes are defined by the CPCA, and in which the PDL is converted to LIPS (UFR) is generated. If the selected printer is the printer 200*b*, and the device app is 1052*b*, a print job whose job attributes are defined by the JPL, and in which the PDL is converted to PCL is generated. In S617, the device-app communication unit 10524 transmits the print job generated in S615 to the selected printer. The device-app communication unit 10524 connects directly to the printer 200 and performs job control using the WSD protocol or a vendor-specific protocol to execute printing.

Although the present embodiment illustrates an example in which the device-app communication unit 10524 of the device app 1052 transmits a print job directly to the printer 200, this is not intended to limit the present invention. For example, the print job may be transmitted via the print manager 318 and the device communication unit 319 provided by the OS. In this case, the conversion of the PDL is not performed, and only the print attributes are rewritten to settings including vender extension. In other words, the print-job generation unit 10525 does not convert the PDL received from the OS and generates a print job including character string information indicating the extended print settings and binary data. The converted print job is input to the print manager 318 again and is transmitted to the printer 200.

[Control of Printer 200]

Next, control of the printer 200 will be described. FIG. 7 is a flowchart illustrating control of the printer 200. The operations (steps) in the flowchart are implemented by the processor of the printer executing programs for implementing the control modules stored in the memory. The flowchart of FIG. 7 is executed in response to activation of the printer 200.

In step S701, the processor of the printer 200 determines whether a request to obtain capability information has been received from an external device. If the request to obtain capability information is received from an external device, the processing proceeds to S702, and if not, the processing proceeds to S703. In step S702, the processor of the printer 200 sends information indicating the capability of the device in response to the request. Here, if the acquisition request is a request for the Get-Printer-Attributes of the IPP, attribute information indicating capabilities that can be used in the IPP is sent by return. In contrast, if the acquisition request is an acquisition request from the device app described in S610 of FIG. 6, device capability information indicating capabilities that are more detailed than the attribute information indicating capabilities available in the IPP is sent by reply.

Next, in step S704, the processor of the printer 200 determines whether a print job has been received from an external device. If a print job has been received from an external device, the processing proceeds to S705, and if not, the processing proceeds to S703.

In step S703, the processor of the printer 200 determines whether a shutdown instruction has been received. If a shutdown instruction has been received, the sequence of processing ends. In contrast, if a shutdown instruction has not been given, the processing returns to S701, and the processor waits for a request or a print job sent from an external device.

As described above, in the present embodiment, even in printing using a printer driver or a print client that generates a print job conforming to a predetermined print protocol, extended capabilities provided by printers of a plurality of vendors can be used as appropriate. The printer driver can be implemented as a class driver conforming to a predetermined print protocol, and extension for each vendor can be implemented by an extension application that operates in a sand-boxed environment. This makes it possible to achieve both of security and convenience. Furthermore, the extension application enables printing that makes use of vendor-specific resources (for example, vendor-specific PDL or JDL). If no extension application is provided or if the user wants no print settings using an extension application, the extension application need not be activated. This allows supporting both of users who like simple printing and users who want detailed print settings.

Second Embodiment

The first embodiment illustrates an example in which a PDL is generated by the common printer driver 1054, and then print settings are extended using the device app 1052. A second embodiment provides a scheme for print settings using a vendor-specific print setting screen also before a print instruction is given.

Since the hardware configuration and the software configuration of the second embodiment are the same as those of the first embodiment, descriptions thereof will be omitted.

Figure 10:
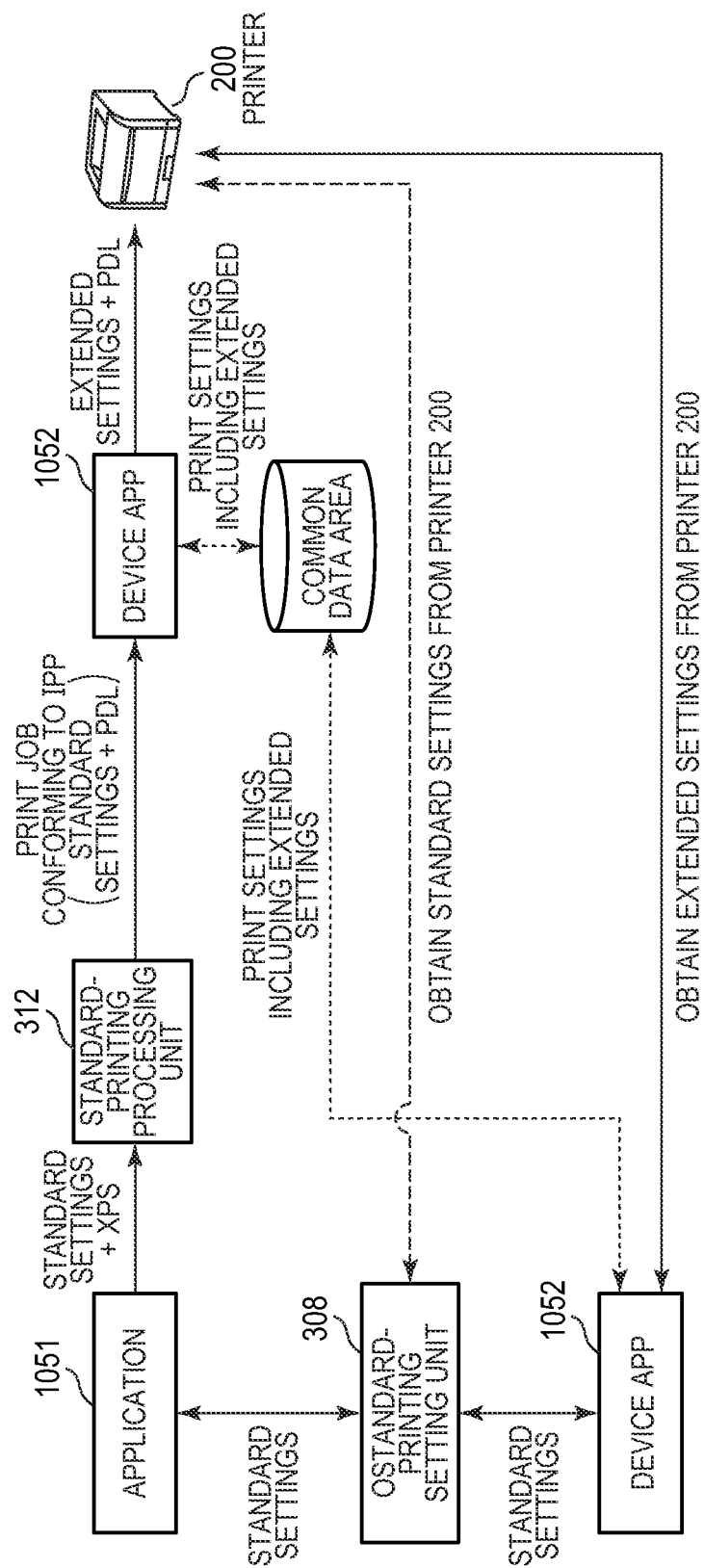
FIG. 10 is a schematic diagram illustrating an example of the processing procedure of the printing system.

First, data processing in executing printing in the second embodiment will be described, in outline, with reference to FIG. 10. FIG. 10 is a schematic diagram illustrating the flow of data when the user performs printing.

The application 1051 obtains standard setting data using the standard-printing setting unit 308, as in the first embodiment.

When an "Additional Settings" key 802 for advanced printing is pressed in a print dialog invoked from the application 1051 or the like, the print architecture 10531 of the OS activates a device app.

The device app 1052 activated by the OS generates extended settings on the basis of capability information obtained from the selected printer. The device app 1052 displays a screen (user interface) for print settings as in FIG. 9 using standard setting data (PrintTicket) passed from the standard-printing setting unit 308 and the extended settings obtained from the capability information obtained from the printer 200. The screen for print settings can display an illustration indicating the form of an output based on printing conditions. The illustration is created as appropriate every time the user changes the print settings and can notify the user how the output will look. Furthermore, favorite print settings or the like can be registered via the screen for print settings. The favorite print settings are stored in a common data area of the device app 1052. The user can select a display item for invoking favorite print settings from a list (not illustrated) to reflect the settings in the print settings.

Upon detecting that the print settings are changed by the user and an OK key is selected, the device app 1052 stores information on the extended settings in the common data area of the device app 1052 and passes the standard settings to the standard-printing setting unit 308. The standard-printing setting unit 308 does not know the information on extended settings that can be provided by the printer 200. Therefore, even if the information on the extended settings is given, the standard-printing setting unit 308 determines that the settings are unknown settings, leading to incorrect control. For this reason, the device app 1052 temporarily stores the extended settings in the common data area. This allows an extended print setting function to be provided without causing the OS 1053 to control the extended settings by the device app 1052, which is activated in different processing in printing, reading the extended settings stored in the common data area.

Figure 11:
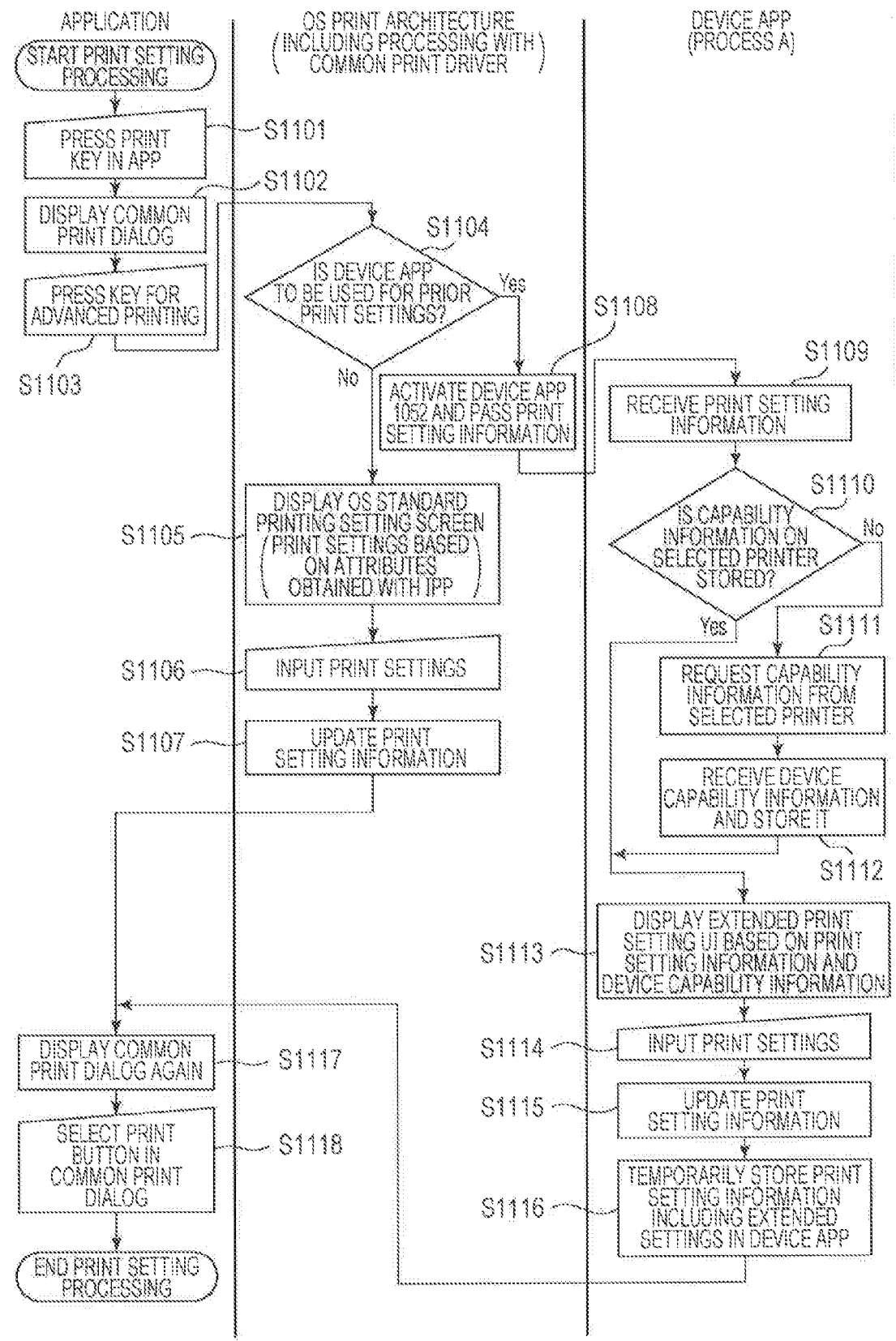
FIG. 11 is a flowchart illustrating an example of control of the client computer.
Figure 12:
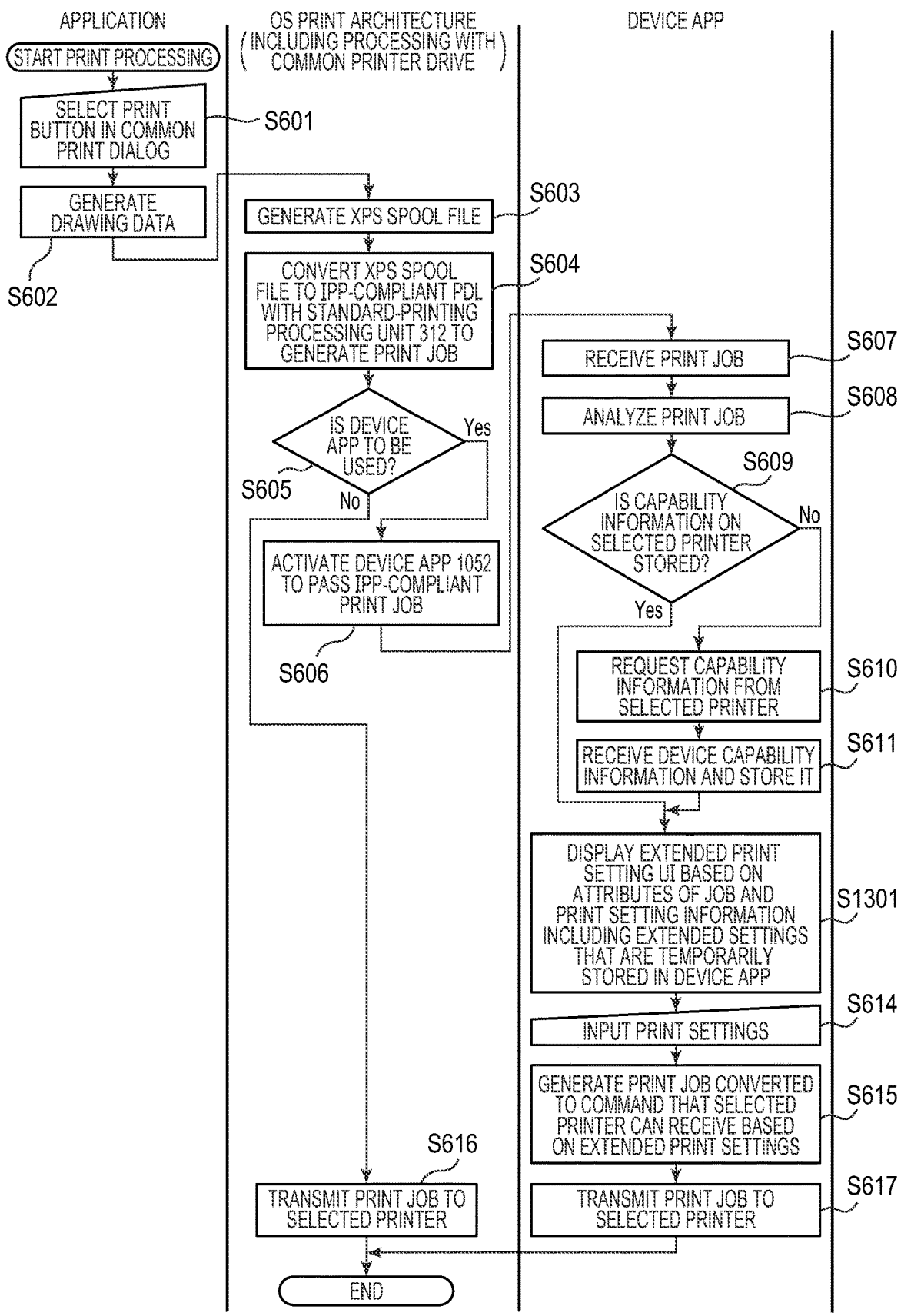
FIG. 12 is a flowchart illustrating an example of control of the client computer.

Specific control will be described with reference to FIGS. 11 to 12. FIGS. 11 to 12 are flowcharts illustrating control of the client computer 100. The operations (steps) in the flowchart of FIG. 11 are implemented by the CPU 101 reading a program for implementing the control modules stored in the ROM 1021 or the storage 105 into the RAM 1022 and executing it. The flowchart in FIG. 11 is executed in response to user operation indicating the intention of printing via a user interface provided by the applications 1051.

In step S1101, the application 1051 receives key selection indicating print intention. In step S1102, the application 1051 displays a common print dialog as illustrated in FIG. 8. In step S1103, the application S1051 receives key selection for advanced printing. An example of the key for advanced printing is "Additional Settings" key 802. Upon receiving a press on the key, the applications 1051 transmits information that specifies a printer driver and a printer and a request for an advanced-printing screen to the OS 1053.

In step S1104, the OS 1053 determines whether to use a device app for prior print settings on the basis of the received information that specifies the printer driver and the selected printer. If a device app that supports the selected printer is not present, the processing proceeds to S1105. In contrast, if a device app for the selected printer is present, the OS 1053 determines whether to activate the device app on the basis of the extension-app-setting storage unit 320. Since the determination is the same as in S605, a description thereof will be omitted. If it is determined to activate the device app, the processing proceeds to S1108, and if not, the processing proceeds to S1105.

In step S1105, the OS 1053 displays a standard print setting screen of the OS on the basis of PrintCapabilities and PrintTicket. The setting screen enables print settings based on the attributes obtained with the IPP. If an instruction for advanced print settings is given from the desktop app, the current print settings are interpreted by converting the print settings to PrintTicket using API that converts DEVMODE and PrintTicket to each other.

In step S1106, the OS 1053 receives an instruction to change the print settings based on the user operation. In step S1107, the OS 1053 updates the standard setting data (DEVMODE or PrintTicket) in S1105. Upon completion of the update, the processing proceeds to S1117.

In contrast, in step S1108, the OS 1053 activates a device app for the selected printer and passes print setting data (standard setting data) to be set for the print job to the device app. If the standard setting data is described in DEVMODE, the OS 1053 sends data converted to PrintTicket.

In step S1109, the activated device app receives the print setting information described in PrintTicket. In S1110 to S1112, extension-setting acquisition processing similar to S609 to S611 in the first embodiment is performed.

In step S1113, the device app displays an extended print setting UI on the basis of the received print setting information and the device capabilities. In step S1114, the device app receives an instruction to change the print settings based on the user operation. In step S1115, the device app updates PrintTicket, which is print setting information. Next in S1116, PrintTicket containing the extended settings updated in S1115 is temporarily stored in the common area that can be accessed from the device app. Upon completion of the processing of S1116, the processing proceeds to S1117. The device app sends standard setting data without the extended settings as the print attribute information to be sent back to the OS.

In step S1117, the applications 1051 displays the common print dialog again on the basis of OS standard function or the standard setting data updated by the device app 1052. In step S1118, the application 1051 receives a print-button selecting operation in the common print dialog. Upon receiving the selecting operation, the sequence of processes for the print setting ends. Next, the print processing in FIG. 12 is performed.

FIG. 12 is a flowchart executed in place of the flowchart of FIG. 6 in the first embodiment. The difference from FIG. 6 is that the processing of S1301 is executed in place of the processing of S613.

Since S601 to S611 are the same as those of the first embodiment, descriptions thereof will be omitted. The processing of the device app activated in S606 and the processing of the device app activated in S1108 are different processes. Accordingly, PrintTicket containing extended settings is transferred via the common storage area that can be accessed by the device apps.

In S1301, the device app 1052 displays the extended print setting UI on the basis of the attributes of the received IPP-compliant print job and PrintTicket containing extended settings stored in the storage area that the device app 1052 can access. The extended print setting UI displayed here may display a display item for calling up the favorite settings stored in the common data area of the device app 1052. This enables the user to use the pre-registered favorite settings also on a print setting screen displayed after the print instruction is given. Upon completion of the display, the processing proceeds to S614. Subsequent processing is the same as the processing of the first embodiment.

The present embodiment provides the effect of being able to allow for pre-settings before printing is started.

[Modifications]

Figure 13:
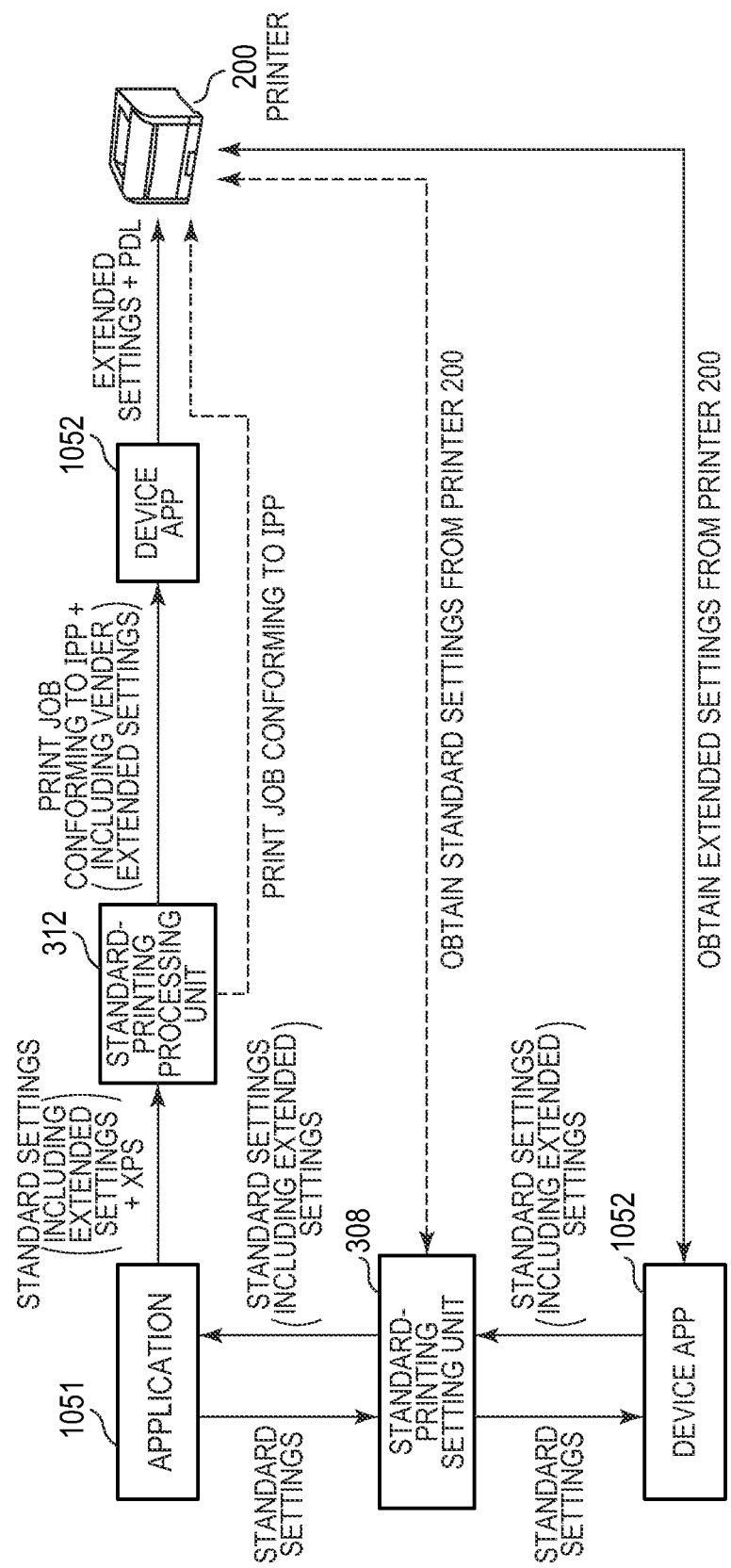
FIG. 13 is a schematic diagram illustrating a modification example.

Although the second embodiment illustrates an example in which extended settings are stored in a common data area, a method for transferring extended settings to a device app is not limited to the above. For example, when an area in which vendors can extend standard settings conforming to the IPP (hereinafter referred to as "vendor extension area") is defined, processing similar to that of the second embodiment can be performed using the area. This processing will be described with reference to the schematic diagram of FIG. 13.

First, the application 1051 obtains standard setting data, which is information conforming to the IPP, using the standard-printing setting unit 308. Upon receiving an instruction for advanced printing via a print dialog, the OS 1053 activates the device app 1052. The device app 1052 displays the extended settings UI illustrated in FIG. 9 using the standard setting data (PrintTicket) transferred from the standard-printing setting unit 308 and extended settings obtained from the capability information obtained from the printer 200. When the OK button in FIG. 9 is pressed by the user, the device app 1052 writes vendor-extension information into PrintTicket. For example, the device app 1052 writes a character string indicating extended settings available to the printer 200, like 1401 in FIG. 14, and transfers the character string to the OS 1053. For the vendor extension area, the vendor-extension information is written so as to be based on specifications prescribed in the IPP. Accordingly, this data is appropriately dealt with also by the standard printer driver 1054 conforming to the IPP. The standard-printing processing unit 312 writes the vendor-extension information written in PrintTicket into attributes indicating the vendor extension area of the IPP-compliant print job as it is. This allows the extension setting information written in the vendor extension area to be transmitted to the device app 1052, which operates in printing, allowing providing an extension setting changing function using this information.

In another modification example, the vendor extension area or the like is not used. For example, the standard-printing processing unit 312 and the print manager 318 generate an IPP-compliant print job containing only attributes conforming to the IPP from PrintTicket. At the same time, in activating the device app, in addition to the IPP-compliant print job, PrintTicket containing the extended settings illustrated in FIG. 14 is passed to the device app. In this case, the device app cancels the print settings conforming to the IPP and displays an extension UI on the basis of the received PrintTicket and the independently obtained device capability information.

In a modification example of the second embodiment, when extended print setting processing before printing using the device app 1052 is started is received, the setting processing (S1113 and S1301) via the extended print setting UI after a print instruction is given may be skipped.

In an aspect of the present invention, even in printing using a printer driver or a print client supporting printers of a plurality of vendors, extended functions of each vendor can be appropriately used. In another aspect of the present invention, the driver is implemented as a class driver conforming to a predetermined print protocol, and extension for each vendor is implemented by an extension application that operates in a sand-boxed environment. This provides both of security and convenience. In another aspect of the present invention, an extension application for a printer driver that generates a print job conforming to a predetermined print protocol is provided so that printing that reflects print settings for each vendor can be performed via the application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus communicating with a printer and storing a printer driver and storing a print setting application in association with the printer driver, the information processing apparatus comprising:
a display; and
a controller configured to:
obtain, via an interface of the Operating System, a first print setting value of a first print setting item, wherein the first print setting item is supported by a common driver which complies with an Internet Printing Protocol;
execute the print setting application to obtain a second print setting value of a second print setting item from the printer, wherein the second print setting item is not supported by a common driver which complies with the Internet Printing Protocol;
cause the display of the information processing apparatus to display a print setting screen by executing the print setting application based on at least the obtained second print setting value of the second print setting item;
accept change instruction of the second print setting value of the second print setting item from a user; and
transmit print data and both of the first print setting value and the second print setting value to the printer.

2. The information processing apparatus according to claim 1, wherein the controller is further configured to:
display another print setting screen based on the obtained first print setting value,
wherein the print setting screen is displayed in response to a selection of an object included in said another print setting screen.

3. The information processing apparatus according to claim 2, wherein the printer is selected via said another print setting screen.

4. The information processing apparatus according to claim 2, wherein the controller is further configured to:
determine whether information of the printer selected via said another print setting screen is associated with any print setting applications; and
display a print setting screen provided by an operating system of the information processing apparatus, in a case that the selected printer is not associated with any print setting applications.

5. The information processing apparatus according to claim 2, wherein the print setting screen is displayed in response to a user instruction for selecting a predetermined object included in said another print setting screen.

6. The information processing apparatus according to claim 1, wherein the print setting screen is provided based on both of the obtained first print setting value and the second print setting value.

7. The information processing apparatus according to claim 1, wherein the second print setting value is obtained after the first print setting value is obtained from the printer.

8. The information processing apparatus according to claim 1, wherein the first print setting item is a predetermined print setting item supported by the Internet Printing Protocol.

9. The information processing apparatus according to claim 1, wherein the print setting screen includes options corresponding to the received second print setting value.

10. A method for controlling an information processing apparatus, having a display, executed by a processor in the information processing apparatus having a printer driver and a print setting application, the method comprising:
executing the print setting application to obtain a second print setting value of a second print setting item from a printer and the method handles a first print setting value of a first print setting item obtained via an interface of the Operating System, wherein the first print setting item is supported by a common driver which complies with an Internet Printing Protocol and the second print setting item is not supported by a common driver which complies with the Internet Printing Protocol;

causing the display of the information processing apparatus to display a print setting screen by executing the print setting application based on at least the obtained second print setting value of the second print setting item, wherein the second print setting value of the second print setting item is set based on an instruction from a user via the print setting screen; and controlling transmitting print data, to the printer, with both of the first print setting value and the second print setting value.

11. The method for controlling the information processing apparatus according to claim 10, wherein the first print setting item is a predetermined print setting item supported by the Internet Printing Protocol.

12. The method for controlling the information processing apparatus according to claim 10, wherein the print setting screen includes options corresponding to the obtained second print setting value.

13. The method for controlling an information processing apparatus according to claim 10, wherein the second print setting item includes at least one of a setting of staple-less binding function for binding sheets without using a staple, a setting of a storage function for storing print data in a storage of the printer and a setting of secure printing and the method causing the display of the information processing apparatus to display the print setting screen by executing the print setting application based on the obtained first print setting value of the first print setting item and the obtained second print setting value of the second print setting item.

14. A non-transitory computer-readable storage medium storing a program that communicates with a printer driver, the program causing an information processing apparatus communicating with a printer and storing the printer driver and storing a print setting application in association with the printer driver to execute a method comprising:

handling a first print setting value of a first print setting item obtained via an interface of the Operating System, wherein the first print setting item is supported by a common driver which complies with an Internet Printing Protocol;

executing the print setting application to obtain a second print setting value of a second print setting item from the printer, wherein the second print setting item is not supported by a common driver which complies with the Internet Printing Protocol;

causing a display of the information processing apparatus to display a print setting screen by executing the print setting application based on at least the obtained second print setting value of the second print setting item, wherein the second print setting value of the second print setting item is set based on an instruction from a user via the print setting screen; and transmitting print data and both of the first print setting value and the second print setting value.

15. The non-transitory computer-readable storage medium according to claim 14, wherein the print setting screen is displayed in response to a user instruction for selecting a predetermined object included in another print setting screen displayed based on the obtained first print setting value.

16. The non-transitory computer-readable storage medium according to claim 15, wherein the second print setting item is not able to be set via said another print setting screen.

17. The non-transitory computer-readable storage medium according to claim 15, the method further causing the information processing apparatus to execute:

generating the print data based on print setting value set via said another print setting screen, wherein the second print setting value is set to the generated print data.

18. The non-transitory computer-readable storage medium according to claim 14, wherein the first print setting item is a predetermined print setting item supported by the Internet Printing Protocol.

19. The non-transitory computer-readable storage medium according to claim 14, wherein the print setting screen includes options corresponding to the obtained second print setting value.

20. The non-transitory computer-readable storage medium according to claim 14, wherein the second print setting item includes at least one of a setting of staple-less binding function for binding sheets without using a staple, a setting of a storage function for storing print data in a storage of the printer and a setting of secure printing, wherein the information processing apparatus causes the display of the information processing apparatus to display the print setting screen by executing the print setting application based on the obtained first print setting value of the first print setting item and the obtained second print setting value of the second print setting item.

* * * * *